(12) United States Patent
Yoo

(10) Patent No.: US 8,499,970 B2
(45) Date of Patent: Aug. 6, 2013

(54) COSMETIC CONTAINER HAVING AN AIRLESS PUMP AND ENABLING THE QUANTITY OF CONTENT REMAINING IN THE CONTAINER TO BE CHECKED

(75) Inventor: Chang Gyu Yoo, Yongin (KR)

(73) Assignee: Amorepacific Corporation, Seoul (KR)

( * ) Notice: Subject to any disclaimer, the term of this patent is extended or adjusted under 35 U.S.C. 154(b) by 0 days.

(21) Appl. No.: 13/515,690

(22) PCT Filed: Jan. 5, 2011

(86) PCT No.: PCT/KR2011/000036
§ 371 (c)(1),
(2), (4) Date: Jun. 13, 2012

(87) PCT Pub. No.: WO2011/083954
PCT Pub. Date: Jul. 14, 2011

(65) Prior Publication Data
US 2012/0267391 A1    Oct. 25, 2012

(30) Foreign Application Priority Data
Jan. 7, 2010    (KR) .................... 20-2010-0000110 U

(51) Int. Cl.
*B67D 7/22* (2010.01)
(52) U.S. Cl.
USPC .............. 222/41; 222/154; 222/256; 116/227
(58) Field of Classification Search
USPC ................ 222/105, 154–159, 256, 389, 296, 222/321.7, 386, 404–405, 41, 23, 46, 402.147, 222/49, 51, 78; 116/109, 227, 273; 137/558; 40/406; 73/327, 293
See application file for complete search history.

(56) References Cited

U.S. PATENT DOCUMENTS

| 3,568,628 | A | * | 3/1971 | Erickson | 116/227 |
| 6,484,900 | B1 | * | 11/2002 | Stiner et al. | 220/662 |
| 6,578,418 | B2 | * | 6/2003 | Dillon | 73/327 |
| 6,651,845 | B1 | * | 11/2003 | Schroeder | 222/83 |
| 6,733,433 | B1 | * | 5/2004 | Fell | 494/37 |
| 6,766,688 | B2 | * | 7/2004 | O'Shea | 73/319 |

(Continued)

FOREIGN PATENT DOCUMENTS

| JP | 06-135473 A | 5/1994 |
| JP | 2007-119047 A | 5/2007 |
| JP | 2007-217038 A | 8/2007 |
| KR | 20-2008-0001831 U | 6/2008 |

OTHER PUBLICATIONS

International Search Report of PCT/KR2011/000036.

*Primary Examiner* — Kevin P Shaver
*Assistant Examiner* — Bob Zadeh
(74) *Attorney, Agent, or Firm* — Maxon IP LLC; Justin H. Kim

(57) ABSTRACT

The invention relates to a cosmetic container with an airless discharge pump, and, more specifically, relates to a cosmetic container with an airless discharge pump in which content amount remaining in the container or content exhaustion level can be confirmed without a separate operation before the content in the container has been completely exhausted and further the state when the content in the container has been completely exhausted can be clearly indicated. To this end, with this cosmetic container, the content exhaustion level is indicated based on changes in projection definition with which the indicator is projected to the transparent window when the transparent compression disk approaches the indicator.

3 Claims, 6 Drawing Sheets

(56) References Cited

U.S. PATENT DOCUMENTS

| | | |
|---|---|---|
| 7,163,125 B2 * | 1/2007 | Murakami et al. ............... 222/51 |
| 7,259,384 B2 * | 8/2007 | Hariram et al. ................ 250/577 |
| 8,365,954 B2 * | 2/2013 | Ophardt et al. ................. 222/95 |
| 2005/0211795 A1 * | 9/2005 | Ueda et al. .................... 239/302 |
| 2007/0264153 A1 * | 11/2007 | Lach, III ......................... 422/56 |
| 2008/0023491 A1 * | 1/2008 | Rousselet ..................... 222/256 |
| 2009/0114679 A1 * | 5/2009 | Ophardt et al. ............... 222/105 |

* cited by examiner

COSMETIC CONTAINER HAVING AN AIRLESS PUMP AND ENABLING THE QUANTITY OF CONTENT REMAINING IN THE CONTAINER TO BE CHECKED

TECHNICAL FIELD

The invention relates to a cosmetic container with an airless discharge pump, and, more specifically, relates to a cosmetic container with an airless discharge pump in which content amount remaining in the container or content exhaustion level can be confirmed without a separate operation before the content in the container has been completely exhausted and further the state when the content in the container has been completely exhausted can be clearly indicated.

RELATED ART

Generally, an airless discharge pump is mounted on an upper end of the cosmetic container to discharge, with appropriate amount, liquid or gel state contents contained in the container.

Such an airless discharge pump may discharge the contents with small and accurate amount and hence has been employed in a functional cosmetic container whose functional content may be typically expensive.

The cosmetic container further includes a piston by which the content contained in the container may always reach a content inlet of the airless discharge pump.

The airless discharge pump is configured so that when a button is pressed down, the content is discharged due to the pressure along a narrow and long fluid path into a nozzle formed on one side of the button, and then a piston mounted at a lower position in the container moves up using vacuum pressure resulting from the discharged content amount so as to lift up and gather together the remaining content.

In that, as mentioned above, the piston should lift up the remaining content in the container, a face of an inner wall of the container must be smooth and the inner wall thereof must have uniform size.

As described above, however, the content contained in the cosmetic container with the airless discharge pump includes chemical components and therefore container material may be limited to those which do not chemically react with the chemical components. Thus, the container generally includes an inner container made of transparent material such as glass or synthetic resin with chemical resistance, and an outer container made of opaque synthetic resin in order to block ambient light. As a result, it is problematic that it is not possible to confirm the content amount remaining in the container or the content exhaustion level.

Accordingly, in case a user may not be informed of the content amount remaining in the container and then has run out of the content, it may be probable that the user miss appropriate time to buy new one and therefore continuity in cosmetic process or treatment is undesirably broken. Moreover, in case the cosmetic container is comparatively small and light and further has the airless discharge pump, the user may not figure out accurately the content exhaust level by shaking the container or measuring weight thereof by hand, thereby causing the user to regret not buying new one in advance.

SUMMARY OF THE INVENTION

Problem to be Solved

Accordingly, the invention is conceptualized with the consideration of the above situation and thus an object thereof is to provide a cosmetic container with an airless discharge pump in which content amount remaining in the container or content exhaustion level can be confirmed without a separate operation before the content in the container has been completely exhausted and further the state when the content in the container has been completely exhausted can be clearly indicated.

Solution for the Problem

The invention provides a cosmetic container capable of confirming content amount remaining in the container or content exhaustion level. This cosmetic container includes a transparent container containing content; an opaque container accommodating the transparent container and whose bottom is a transparent window; a discharge pump installed to an opening end of the opaque container from the transparent container upward to discharge the content using pressure; a transparent compression disk received in a tight manner to and in an inner wall of the transparent container so as to move up toward the discharge pump due to vacuum pressure resulting from the discharging of the content and hence to gather together the content; and an indicator installed onto a bottom face of the discharge pump. With this cosmetic container, the content exhaustion level is indicated based on changes in projection definition with which the indicator is projected to the transparent window when the transparent compression disk approaches the indicator.

Effect of the Invention

In accordance with the invention, the user may be informed of the content amount remaining in the container before the content in the container has been substantially exhausted, so that the user may buy new one in advance before she/he has run out of the content. Accordingly, the user may not miss the appropriate time to buy new one and therefore the continuity in cosmetic process or treatment is desirably kept.

Moreover, in accordance with the invention, the content exhaustion level can be confirmed without any separate operation relative to the container by the user, thereby improving user convenience and experience.

Furthermore, in accordance with the invention, in case the content is not discharged out of the container, it is possible to identify the reason why the content is not discharged out of the container. For example, it is determined whether the content in the container has been completely exhausted or the discharge pump is out of order. In this way, the user may be more accurately informed of current state of the cosmetic container.

BRIEF DESCRIPTION OF THE ACCOMPANYING DRAWINGS

Embodiments of the present invention are illustrated by way of example, and not by way of limitation, in the drawings and in which like reference numerals refer to similar elements.

DETAILED DESCRIPTION

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Below, a preferred exemplary embodiment of the invention will be described in details with reference to the accompanying drawings. It should be understood that the invention is not limited to the exemplary embodiment but rather many variations may be possible to the skilled person to the art.

Figure 1:
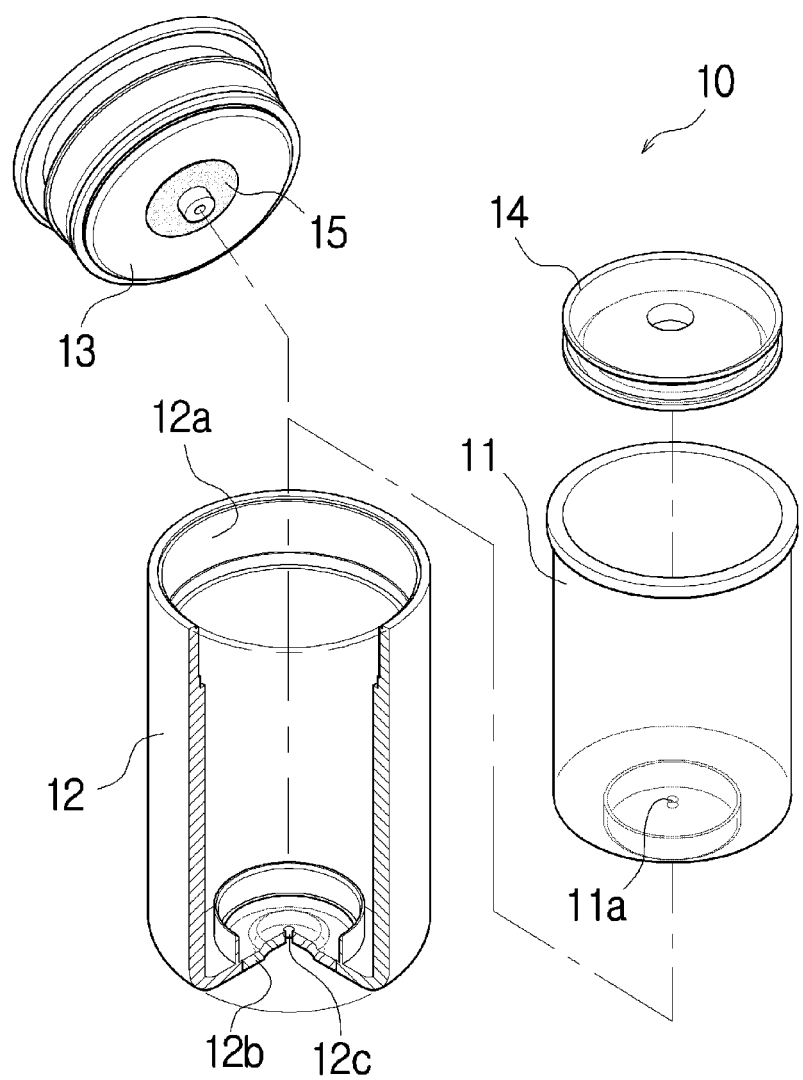
FIG. 1 is a perspective view of a cosmetic container according to one exemplary embodiment of the invention.
Figure 2:
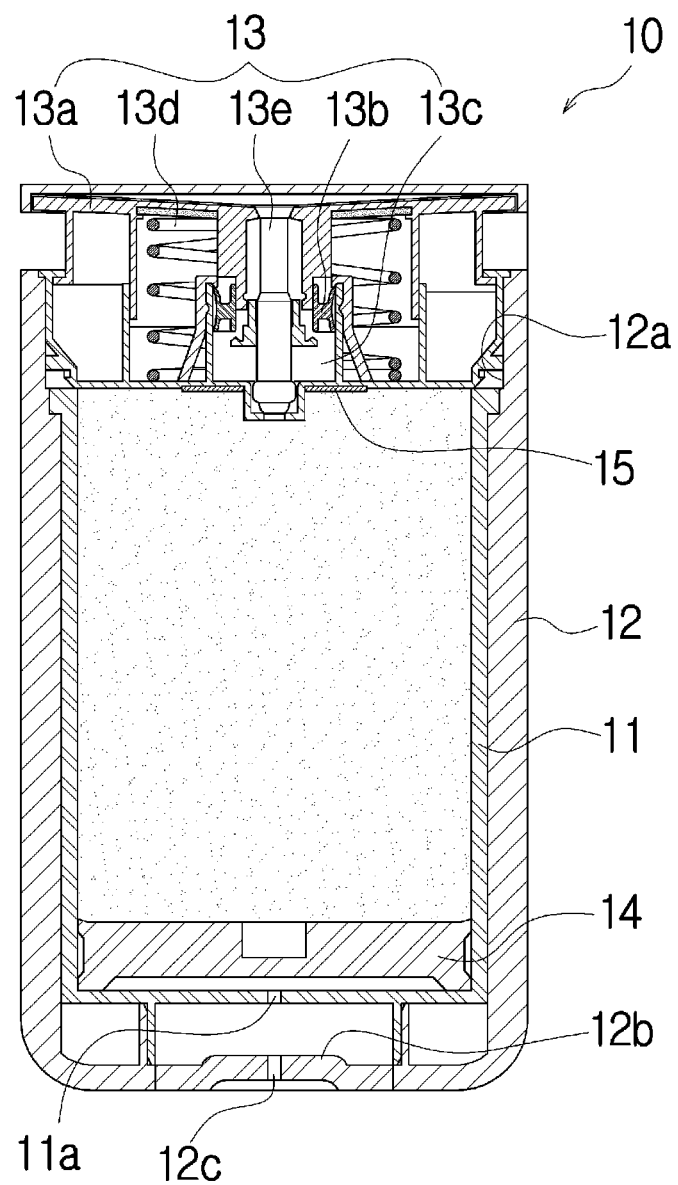
FIG. 2 is a more detailed cross-sectional view of the cosmetic container according to one exemplary embodiment of the invention.
Figure 3:
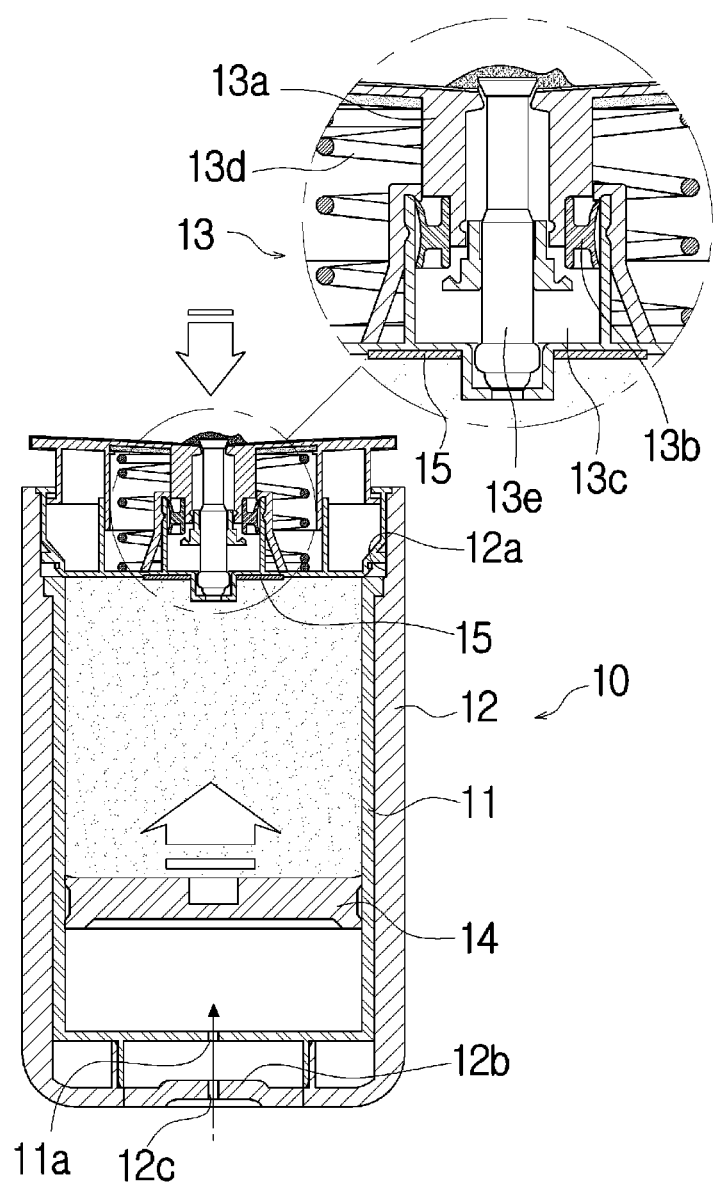
FIG. 3 to FIG. 5 are cross-sectional views of operational states of the cosmetic container according to one exemplary embodiment of the invention.
Figure 4:
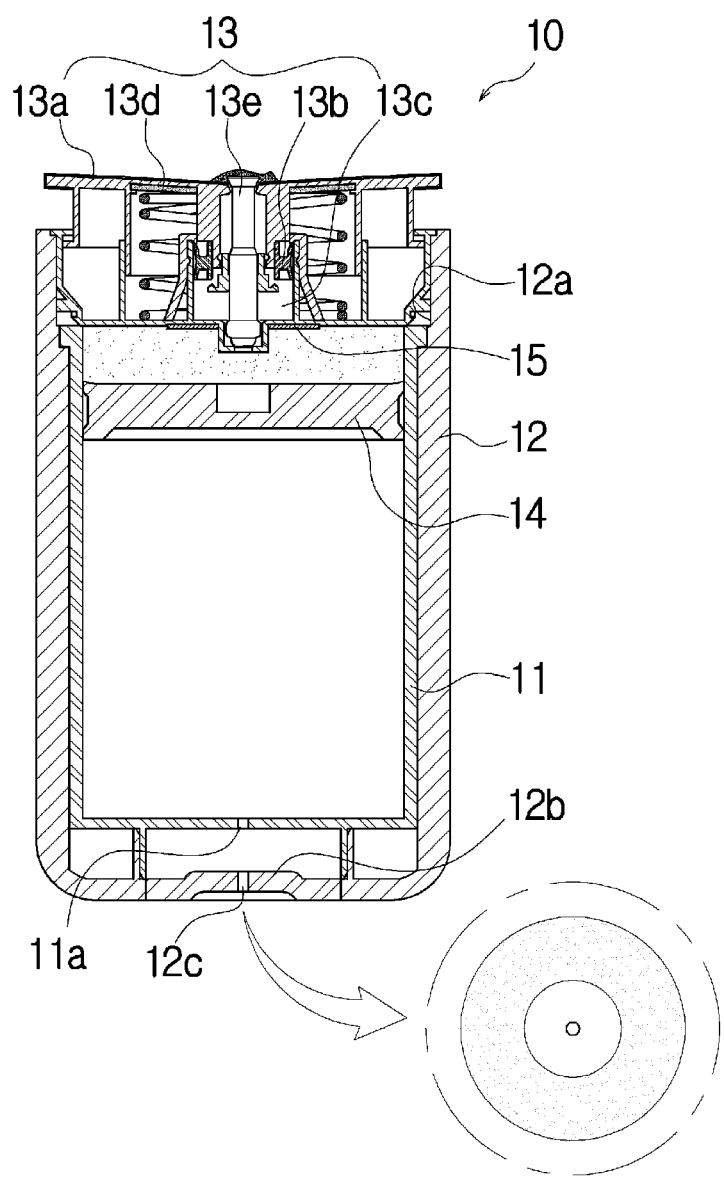
Figure 5:
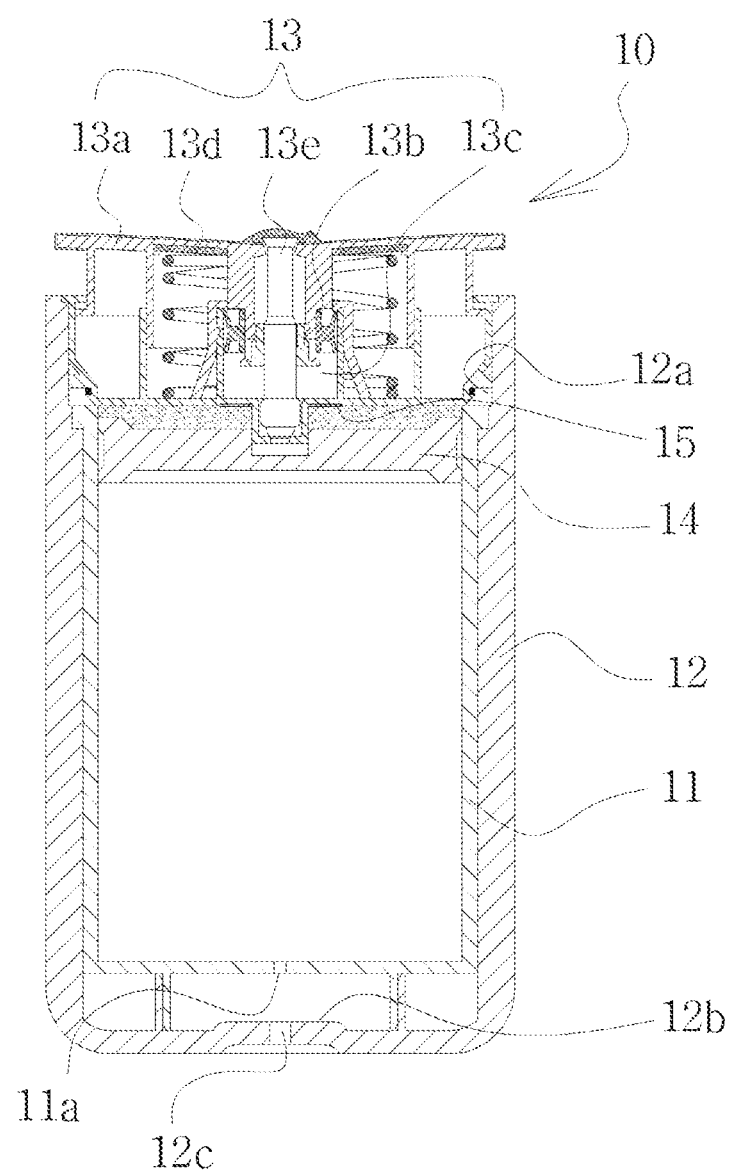
Figure 6:
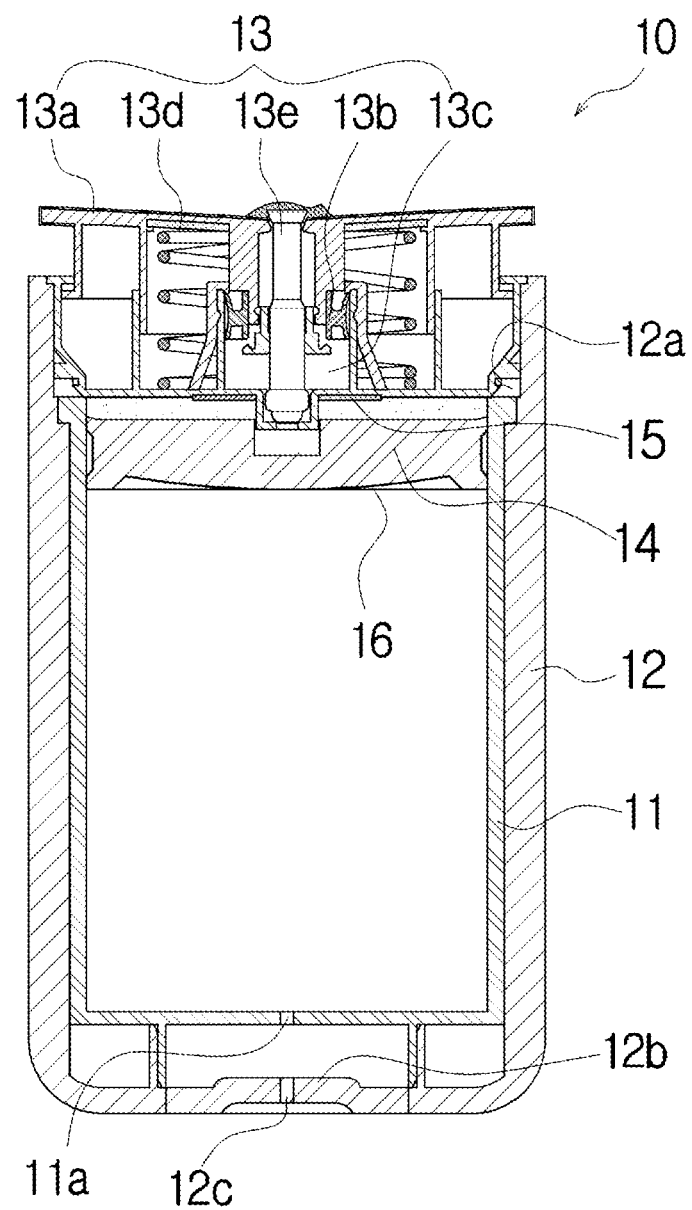
FIG. 6 is a cross-sectional view of a cosmetic container according to other exemplary embodiment of the invention.

The accompanying drawings are as follows. FIG. 1 is a perspective view of a cosmetic container according to one exemplary embodiment of the invention. FIG. 2 is a more detailed cross-sectional view of the cosmetic container according to one exemplary embodiment of the invention. FIG. 3 to FIG. 5 are cross-sectional views of operational states of the cosmetic container according to one exemplary embodiment of the invention. FIG. 6 is a cross-sectional view of a cosmetic container according to other exemplary embodiment of the invention.

Now, referring to FIG. 1 to FIG. 2, one exemplary embodiment of the invention provides a cosmetic container 10 capable of confirming content amount remaining in the container or content exhaustion level. This cosmetic container 10 includes a transparent container 11 containing content; an opaque container 12 accommodating the transparent container 11 and whose bottom face has a transparent window 12b; a discharge pump 13 installed to an opening end 12a of the opaque container 12 from the transparent container 11 upward to discharge the content using pressure; a transparent compression disk 14 received in a tight manner to and in an inner wall of the transparent container 11 so as to move up toward the discharge pump 13 due to vacuum pressure resulting from the discharging of the content and hence to gather together the content; and an indicator 15 installed onto a bottom face of the discharge pump 13. With this cosmetic container 10, the content exhaustion level is indicated based on changes in projection definition with which the indicator 15 is projected to the transparent window 12b when the transparent compression disk 14 approaches the indicator 15.

The transparent container 11 is made of glass or synthetic resin which does not chemically react with the chemical components contained in the cosmetic content, and whose upper end gets opened and an air inlet hole 11a is formed in a bottom face.

The opaque container 12 is a housing surrounding an entire outer face of the transparent container 11 and whose upper end 12a gets opened as well from the opened end of the transparent container 11 upward and whose bottom face has a transparent window 12b in which an air inlet hole 12c is formed.

The discharge pump 13 is an airless discharge pump configured so that when a button 13a is pressed down and in turn a piston 13b moves down in association with the pressure, the content flowed previously from the transparent container 11 into a content storage chamber 13c is discharged out of the container 10 due to the pressure, and, then, when the button 13a returns to an original position using restoring force from a spring 13d, the content flows from the transparent container 11 into the content storage chamber 13c due to vacuum pressure so as to be ready to be discharged out of the container 10. This airless discharge pump 13 may be fixed to an inner wall of the opened end 12a of the opaque container 12 using adhesive agent or ultrasonic adhering approach.

At this time, a content outlet hole of a central discharging end of the discharge pump 13 may be opened or closed using an embedded checking valve 13e.

The transparent compression disk 14 may be a transparent piston which is received at a lower position of and in a tight manner to and in the inner wall of the transparent container 11 so as to lift up the content toward the discharge pump 13.

The indicator 15 is a color tag installed onto a center region of the bottom face of the discharge pump 13. It is preferable that the center region of the bottom face of the discharge pump 13 is located within a region of the bottom face corresponding to an inner region of the transparent container 11.

Here, it suffices for a color of the color tag to consider projection performance and distinguishable property. In an exemplary embodiment of the invention, the color of the color tag is red.

Now, operation of the cosmetic container 10 configured as described above will be explained below.

When the button 13a of the discharge pump 13 is pressed down and in turn the piston 13b moves down in association with the pressure, the content flowed previously from the transparent container 11 into the content storage chamber 13c is discharged out of the container 10 due to the pressure, and, then, when the button 13a returns to an original position using restoring force from the spring 13d, the content flows from the transparent container 11 into the content storage chamber 13c due to vacuum pressure so as to be ready to be discharged out of the container 10.

Speaking specifically, as shown in FIG. 3, when the button 13a of the discharge pump 13 is pressed down, the piston 13b moving in association with the button 13a presses the content flowed previously into the content storage chamber 13c.

With the content being pressed as mentioned above, the checking valve 13e blocks a content inlet hole for communicating between the content storage chamber 13c and the transparent container 11 by selectively closing the content inlet hole. Meanwhile, the checking valve 13e may selectively open or close the content inlet hole.

When the content inlet hole is blocked by the checking valve 13e, the content stored in the content storage chamber 13c is discharged out of the container 10 through a content outlet path opened by the checking valve 13e embedded in the button 13a into a outlet hole at a tip end of the content discharging path.

After certain amount of the content has been discharged out of the container by pressing the button 13a, external force is removed from the button 13a, and, then, the button 13a returns to an original position using restoring force from the spring 13d, in other words, the button 13a gradually moves up due to resilient force of the spring 13d.

When the button 13a has moved up to its original position, vacuum pressure is generated within the content storage chamber 13c. Accordingly, when the vacuum pressure is generated within the content storage chamber 13c, the checking valve 13e blocking in a tight manner the content inlet hole for communicating between the content storage chamber 13c and the transparent container 11 may be loosened from the content inlet hole, thereby the content inlet hole coming into opened state. In this way, the content again flows from the transparent container 11 into the content storage chamber 13c so as to be ready to be discharged out of the container 10.

When the content flows from the transparent container 11 into the content storage chamber 13c, the compression disk 14 within the transparent container 11 moves up toward the discharge pump 13.

The reason why the compression disk 14 within the transparent container 11 moves up toward the discharge pump 13 is that as the content flows from the transparent container 11 into the content storage chamber 13c, the vacuum pressure is generated in the transparent container 11 so as to attract the compression disk 14 upwards.

In such a cosmetic container 10, the content is gradually exhausted with repetition of above-mentioned discharging operations of the content out of the container 10. Meanwhile, in case amount of the content remaining in the transparent container 11 is large and thus distance between the indicator 15 and the compression disk 14 becomes considerable, the indicator 15 may not be projected to the transparent window 12b of the opaque container 12 because of abundance of the content in the transparent container 11.

As shown in FIG. 4, however, in such a cosmetic container 10, the content has been substantially exhausted with the repetitions of above-mentioned discharging operations of the content out of the container, and, thus distance between the indicator 15 and the compression disk 14 becomes much shorter, the indicator 15 may be projected to the transparent window 12b of the opaque container 12 with a little projection definition through much smaller amount of the content in the transparent container 11.

At this time, for example, in case the content is transparent, the red color tag as the indicator 15 is visible obscurely to the user as the red color, while in case the content is white-colored, the red color tag as the indicator 15 is visible as pink color to the user.

Accordingly, at this time, the user will plan to buy a new cosmetic product to use new one immediately when the current cosmetic product has been completely exhausted.

Thereafter, as shown in FIG. 5, the content has been completely exhausted with the repetitions of above-mentioned discharging operations of the content out of the container, and, thus distance between the indicator 15 and the compression disk 14 becomes substantially zero, the indicator 15 may be clearly projected to the transparent window 12b of the opaque container 12 with good projection definition, thereby indicating the state in which the content has been completely exhausted.

Moreover, as shown in FIG. 6, the cosmetic container 17 may further include enlarging projection means 16 provided at a lower face of the transparent compression disk 14 to make the indicator 15 visible in an enlarged manner.

The enlarging projection means 16 may be formed of the lower face of the transparent compression disk 14 which is protruded in a convex way. Alternatively, the enlarging projection means 16 may be provided by attaching a separate convex lens to the lower face of the transparent compression disk 14.

In accordance with this cosmetic container 10, the user may be informed of the content amount remaining in the container before the content in the container has been substantially exhausted, so that the user may buy new one in advance before she/he has run out of the content. Accordingly, the user may not miss the appropriate time to buy new one and therefore the continuity in cosmetic process or treatment is desirably kept.

Moreover, in accordance with this cosmetic container 10, the content exhaustion level can be confirmed without any separate operation relative to the container by the user, thereby improving user convenience and experience.

Furthermore, in accordance with this cosmetic container 10, in case the content is not discharged out of the container, it is possible to identify the reason why the content is not discharged out of the container. For example, it is determined whether the content in the container has been completely exhausted or the discharge pump is out of order. In this way, the user may be more accurately informed of current state of the cosmetic container.

It is to be understood that the embodiments and variations shown and described herein are merely illustrative of the principles of this invention and that various modifications may be implemented by those skilled in the art without departing from the scope and spirit of the invention.

What is claimed is:

1. A cosmetic container, comprising:
   a transparent container containing content;
   an opaque container accommodating the transparent container and whose bottom face has a transparent window;
   a discharge pump installed to an opening end of the opaque container from the transparent container upward to discharge the content using pressure;
   a transparent compression disk received in a tight manner to and in an inner wall of the transparent container so as to move up toward the discharge pump due to vacuum pressure resulting from the discharging of the content and hence to gather together the content; and
   an indicator installed onto a bottom face of the discharge pump,
   wherein content exhaustion level is indicated based on changes in projection definition with which the indicator is projected to the transparent window when the transparent compression disk approaches the indicator.

2. The cosmetic container of claim 1, wherein the transparent compression disk is a transparent piston which is received at a lower position of and in a tight manner to and in the inner wall of the transparent container so as to lift up the content toward the discharge pump, and
   wherein the indicator is a color tag installed onto a center region of the bottom face of the discharge pump.

3. The cosmetic container of claim 1, further comprising enlarging projection means provided at a lower face of the transparent compression disk to make the indicator visible in an enlarged manner.

* * * * *